DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 707

T888,016
PHOTOGRAPHIC MATERIALS
Norman W. Kalenda, Kodak Park, Rochester, N.Y. 14650
Filed Dec. 4, 1970, Ser. No. 95,419
**Int. Cl. G03c *1/10***
U.S. Cl. 96—126
No Drawing. 27 Pages Specification

Photographic silver halide emulsions contain a sensitizing combination comprising a merocyanine dye having an imino group on the acidic nucleus thereof, and a pyridine and/or a quinoline base. The preferred merocyanine dyes have one of the following formulas:

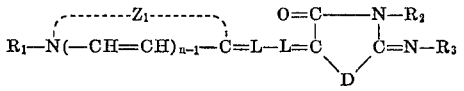

and

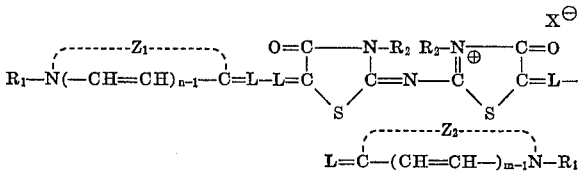

wherein $n$ and $m$ each represents a positive integer of from 1 to 2; L represents a methine linkage; D represents an oxygen atom, a sulfur atom, a selenium atom or the group =N—R; R, $R_1$, $R_2$ and $R_4$ each represents an alkyl group or an aryl group; $R_3$ represents an amino group, an alkyl group, an aryl group, an acyl group, an arylsulfonyl group, an alkoxycarbonyl group, a carboxyalkylcarbonyl group, a 5- to 6-membered nitrogen containing heterocyclic group, and the group

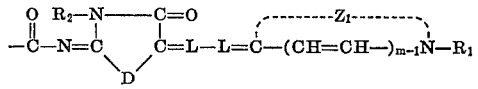

wherein $Z_1$, $m$, D, $R_1$ and $R_2$ are as above defined; X represents an acid anion; and $Z_1$ and $Z_2$ each represents the non-metallic atoms necessary to complete a nitrogen containing heterocyclic nucleus containing from 5 to 6 atoms in the heterocyclic ring. A preferred combination comprises 3 - ethyl-5-[(3-ethyl-2-benzothiazolinylidene)ethylidiene]-2-p-carboxyphenylimino-4-thiazolidinone and pyridine.